(12) United States Patent
Shim et al.

(10) Patent No.: US 11,803,177 B1
(45) Date of Patent: Oct. 31, 2023

(54) METHOD AND APPARATUS FOR DETECTING ANOMALY DATA

(71) Applicant: MakinaRocks Co., Ltd., Seoul (KR)

(72) Inventors: Sangwoo Shim, Gangwon-Do (KR); Jongsun Shinn, Seoul (KR); Kyounghyun Mo, Seoul (KR); Young Jae Choung, Gyeonggi-Do (KR); Jongseob Jeon, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

(21) Appl. No.: 18/020,112

(22) PCT Filed: Jun. 9, 2022

(86) PCT No.: PCT/KR2022/008111
§ 371 (c)(1),
(2) Date: Feb. 7, 2023

(87) PCT Pub. No.: WO2022/265292
PCT Pub. Date: Dec. 22, 2022

(30) Foreign Application Priority Data

Jun. 14, 2021 (KR) .................. 10-2021-0076784

(51) Int. Cl.
*G05B 23/02* (2006.01)
(52) U.S. Cl.
CPC ..... *G05B 23/0221* (2013.01); *G05B 23/0272* (2013.01); *G05B 23/0281* (2013.01)
(58) Field of Classification Search
CPC ............ G05B 23/0221; G05B 23/0272; G05B 23/0281
See application file for complete search history.

(56) References Cited

U.S. PATENT DOCUMENTS

| 6,442,733 | B1 | 8/2002 | Fujiwara et al. |
| 8,452,778 | B1* | 5/2013 | Song .................. G06F 16/7844 |
| | | | 707/748 |
| 8,768,745 | B2* | 7/2014 | Handley ............... G06Q 10/06 |
| | | | 705/7.31 |
| 9,072,496 | B2* | 7/2015 | Rao ....................... A61B 5/055 |
| 10,885,456 | B2* | 1/2021 | Spiro ................ G05B 23/0237 |
| 11,169,514 | B2* | 11/2021 | Song ...................... G06N 3/045 |
| 11,204,602 | B2* | 12/2021 | Cheng ................ G06F 18/2413 |
| 2011/0191076 | A1 | 8/2011 | Maeda et al. |
| 2021/0065023 | A1 | 3/2021 | Naito et al. |
| 2021/0124989 | A1 | 4/2021 | Kim et al. |

(Continued)

FOREIGN PATENT DOCUMENTS

| JP | 4762088 B2 | 8/2011 |
| JP | 2021-33705 A | 3/2021 |
| KR | 10-1999-0083505 A | 11/1999 |

(Continued)

*Primary Examiner* — Mohammad K Islam

(74) *Attorney, Agent, or Firm* — Harris Beach PLLC

(57) ABSTRACT

An anomaly data detecting method performed by a computing device having at least one processor includes acquiring first time-series data, dividing the first time-series data into a plurality of sub time-series data, adjusting scales of variable values included in at least one sub time-series data among the plurality of sub time-series data and determining whether the first time-series data is abnormal by inputting scaled first time-series data to a neural network based detection model.

14 Claims, 7 Drawing Sheets

(56) References Cited

U.S. PATENT DOCUMENTS

2021/0397950 A1    12/2021  Kim et al.
2023/0261693 A1*  8/2023  Dafesh ................. H04B 1/1027
                                                                      375/148

FOREIGN PATENT DOCUMENTS

| KR | 10-2011-0026515 A | 3/2011 |
| KR | 10-1883277 B1 | 7/2018 |
| KR | 10-2095653 B1 | 3/2020 |
| KR | 10-2020-0080402 A | 7/2020 |
| KR | 10-2021-0050413 A | 5/2021 |
| KR | 10-2309111 B1 | 10/2021 |
| KR | 10-2022-0007841 A | 1/2022 |

* cited by examiner

[FIG. 1]
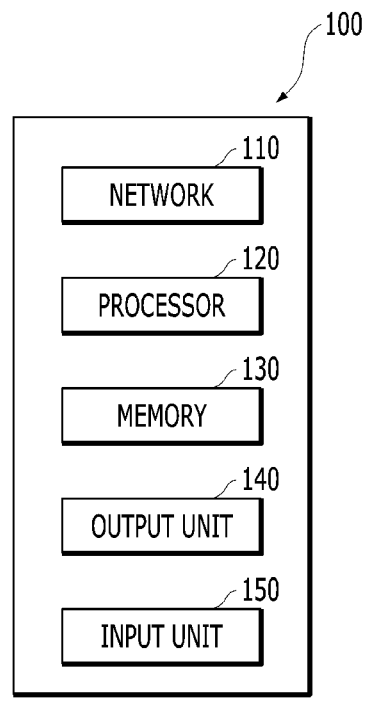
[FIG. 2]
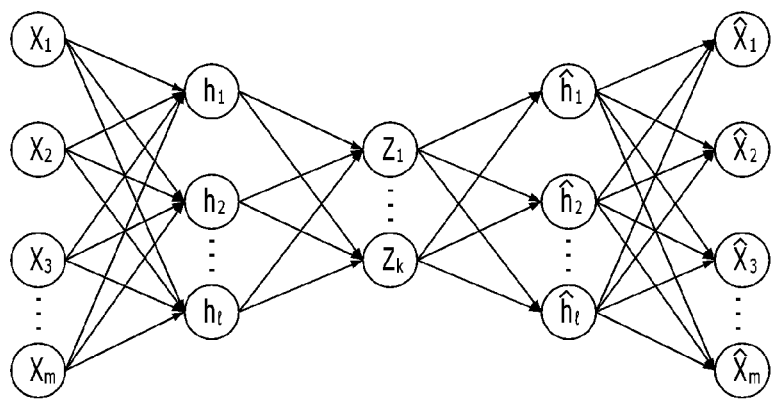

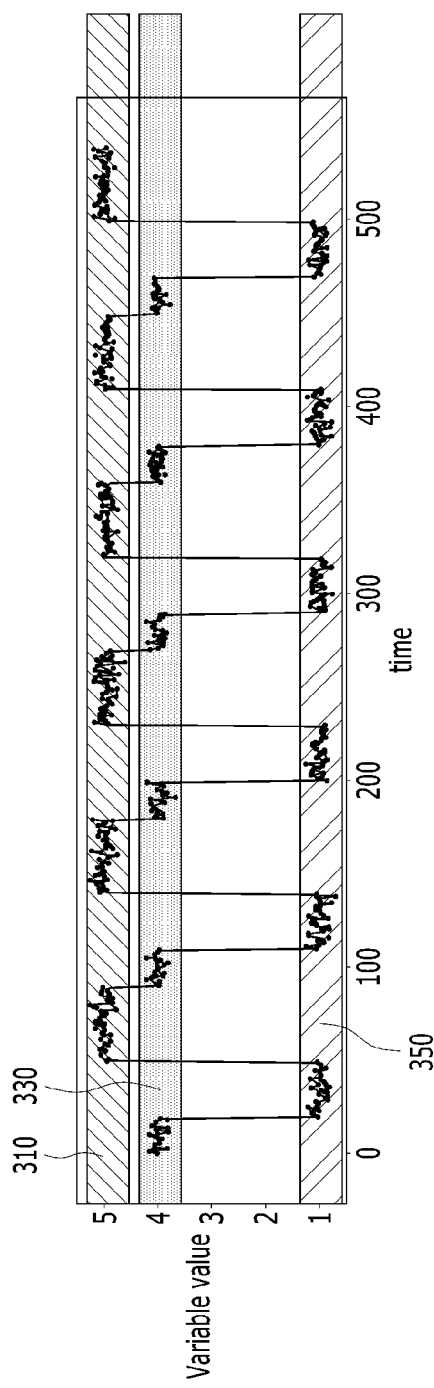
[FIG. 3]

[FIG. 4]
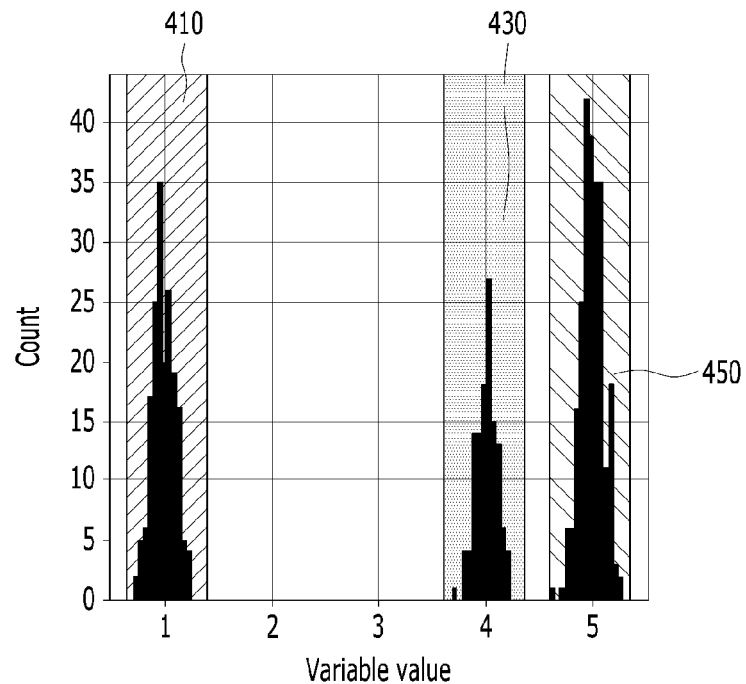
[FIG. 5]
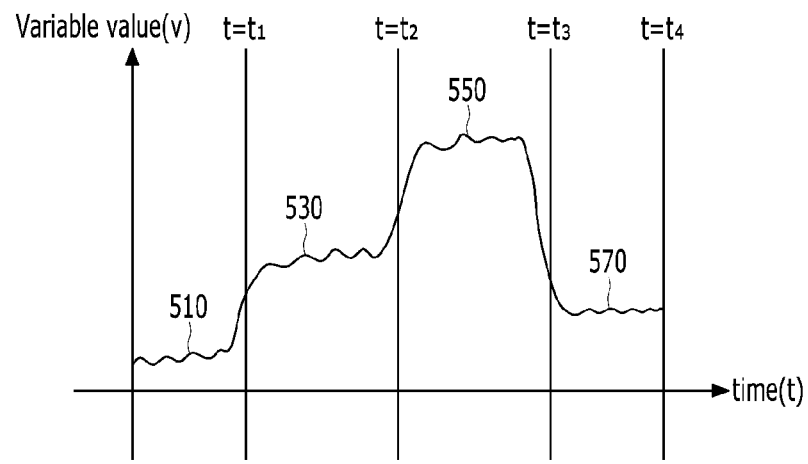

[FIG. 6]
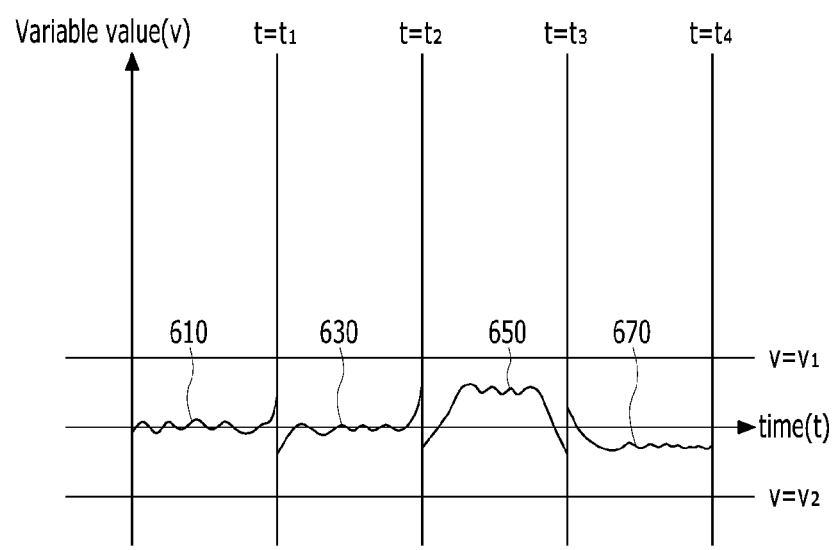

[FIG. 7]
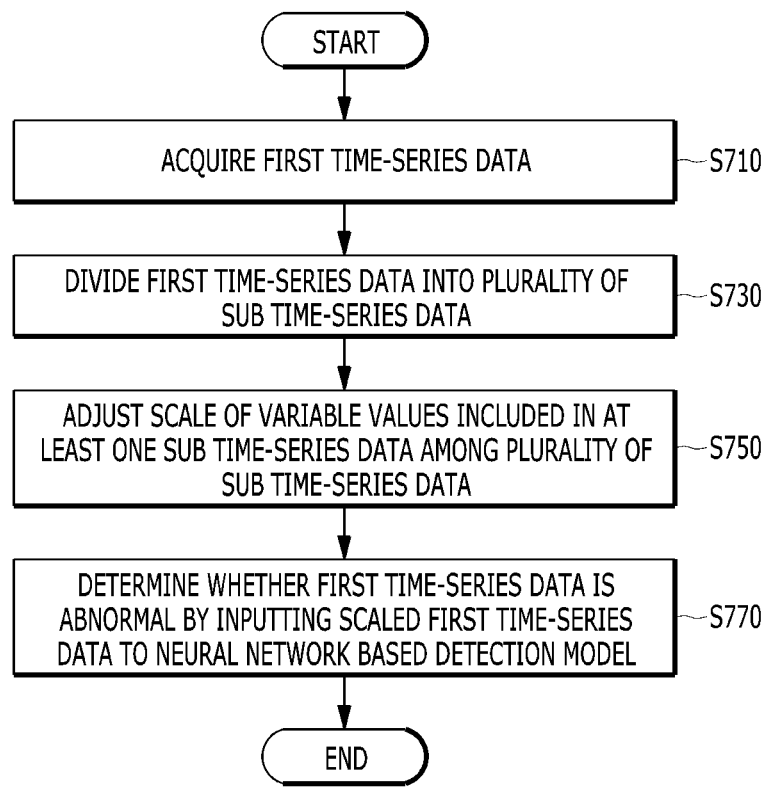

[FIG. 8]
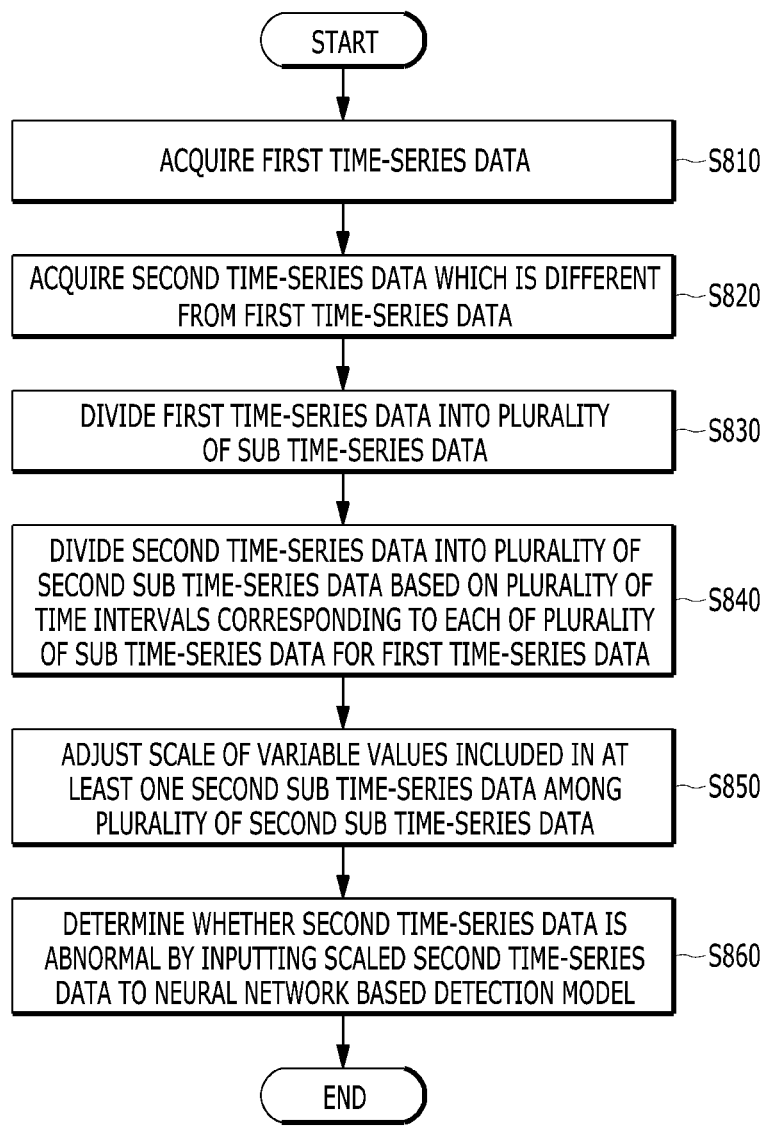

[FIG. 9]
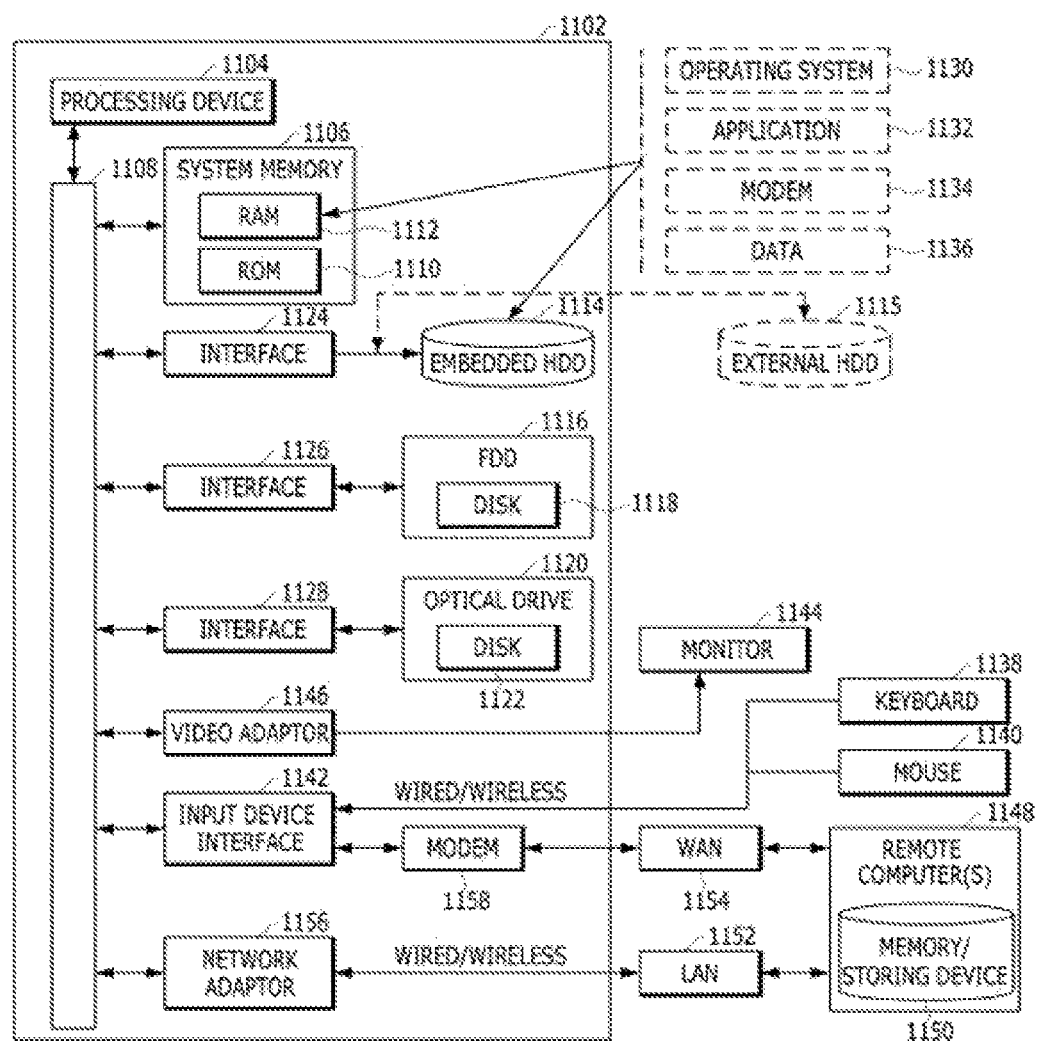

METHOD AND APPARATUS FOR DETECTING ANOMALY DATA

CROSS-REFERENCE TO RELATED APPLICATIONS

This application is a national stage application under 35. U.S.C. § 371 of PCT Application No PCT/KR2022/008111, filed on Jun. 9, 2022, which claims priority to, and the benefit of, Korean Application No. 10-2021-0076784 filed on Jun. 14, 2021, the entire contents of each application being incorporated herein by reference thereto.

TECHNICAL FIELD

The present disclosure relates to a method for detecting anomaly data, and more particularly, to an anomaly data detecting method using an artificial neural network.

BACKGROUND ART

The present disclosure relates to a method for detecting whether time-series data generated during a manufacturing process is abnormal.

Time-series data generated during the manufacturing process has a measured time and a value obtained from a sensor. However, when the time-series data has various peak values because it is acquired during a process of manufacturing a plurality of products, even though an artificial neural network model is trained to sense an anomaly pattern of the time-series data, the training result of the artificial neural network model may succeed or fail depending on a preprocessing method of data which is actually input to the model.

Accordingly, in the field of the present disclosure, demands for an effective data preprocessing method and an anomaly data detecting method thereby are increasing.

Korean Registered Patent No. 10-1883277 discloses a method and a device for fault detection of manufacturing process based on DTWEP.

DISCLOSURE

Technical Problem

The present disclosure has been made to correspond to the above-described background art and an object thereof is to provide an anomaly data detecting method using a neural network.

Technical Solution

In order to achieve the above-described objects, according to an exemplary embodiment of the present disclosure, an anomaly data detecting method performed by a computing device including at least one processor is disclosed. The method includes acquiring first time-series data, dividing the first time-series data into a plurality of sub time-series data; adjusting a scale of variable values included in at least one sub time-series data among the plurality of sub time-series data; and determining whether the first time-series data is abnormal by inputting scaled first time-series data to a neural network based detection model.

In an alternative exemplary embodiment, the first time-series data is acquired from at least one sensor used to produce a plurality of different products according to a time order.

In an alternative exemplary embodiment, the dividing is performed based on time information included in the first time-series data and each of the plurality of sub time-series data corresponds to a plurality of different time intervals.

In an alternative exemplary embodiment, the dividing including: dividing the first time-series data into a plurality of sub time-series data based on setting parameter information, and the first time-series data is acquired from one or more sensors as a result of inputting the setting parameter information to a computing device.

In an alternative exemplary embodiment, the dividing is performed based on histogram data representing statistic information related to a plurality of variable values included in the first time-series data.

In an alternative exemplary embodiment, the dividing includes: displaying a user interface including the histogram data; receiving a user input including information for division; and dividing the first time-series data into a plurality of sub time-series data based on the received user input.

In an alternative exemplary embodiment, the dividing is performed by applying a K-means clustering algorithm to the histogram data.

In an alternative exemplary embodiment, the adjusting is performed by applying a scaling function to at least one sub time-series data among the plurality of sub time-series data.

In an alternative exemplary embodiment, the adjusting is performed by applying a scaling function to two or more different sub time-series data among the plurality of sub time-series data.

In an alternative exemplary embodiment, the scaling function may be a standard scaling function or a min-max scaling function.

In an alternative exemplary embodiment, the adjusting is performed based on a previously determined robust mean.

In an alternative exemplary embodiment, the robust mean is calculated based on a plurality of time-series data which is stored in advance in a computing device.

In an alternative exemplary embodiment, the neural network based detection model has an auto encoder neural network structure including an encoder model and a decoder model.

In an alternative exemplary embodiment, the neural network based detection model is trained based on at least one scaled training time-series data generated as a result of performing the dividing and the adjusting on at least one training time-series data.

In an alternative exemplary embodiment, the method further includes: acquiring second time-series data which is different from the first time-series data; dividing the second time-series data into a plurality of second sub time-series data based on a plurality of time intervals corresponding to each of the plurality of sub time-series data for the first time-series data, adjusting a scale of variable values included in at least one second sub time-series data among the plurality of second sub time-series data; and determining whether the second time-series data is abnormal by inputting scaled second time-series data to a neural network based detection model.

In order to achieve the above-described objects, according to an aspect of the present disclosure, a computer program stored in a computer readable storage medium is disclosed. When the computer program is executed by one or more processors, the computer program performs the following operations to detect anomaly data and the operations include: an operation of acquiring first time-series data, an operation of dividing the first time-series data into a plurality of sub time-series data; an operation of adjusting a scale of variable values included in at least one sub time-series data among the plurality of sub time-series data; and an operation of determining whether the first time-series data is abnormal by inputting scaled first time-series data to a neural network based detection model.

In order to achieve the above-described objects, according to an aspect of the present disclosure, an anomaly data detecting apparatus is disclosed. The apparatus includes: one or more processors, a memory; and a network unit and the one or more processors is configure to: acquire first time-series data, divide the first time-series data into a plurality of sub time-series data, adjust a scale of variable values included in at least one sub time-series data among the plurality of sub time-series data, and determine whether the first time-series data is abnormal by inputting scaled first time-series data to a neural network based detection model.

Advantageous Effects

The present disclosure provides an anomaly data detecting method using an artificial neural network.

DESCRIPTION OF DRAWINGS

FIG. 1 is a block diagram of a computing device for detecting anomaly data according to an exemplary embodiment of the present disclosure;

FIG. 2 is a schematic view illustrating a network function according to an exemplary embodiment of the present disclosure;

FIG. 3 is an exemplary diagram illustrating first time-series data according to an exemplary embodiment of the present disclosure on a graph;

FIG. 4 is an exemplary diagram illustrating histogram data representing statistic information about a plurality of variable values included in first time-series data according to an exemplary embodiment of the present disclosure on a graph;

FIG. 5 is an exemplary diagram illustrating time-series data which is divided into a plurality of sections on a graph;

FIG. 6 is an exemplary diagram illustrating scaled time-series data on a graph;

FIG. 7 is an exemplary flowchart of a method for detecting anomaly data by a computing device according to an exemplary embodiment of the present disclosure;

FIG. 8 is an exemplary flowchart of a method for detecting anomaly data by a computing device according to another exemplary embodiment of the present disclosure; and FIG. 9 illustrates a simple and general schematic view of an exemplary computing environment in which exemplary embodiments of the present disclosure are embodied.

BEST MODE

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a block diagram of a computing device for detecting anomaly data according to an exemplary embodiment of the present disclosure. A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100. The computing device 100 may include a processor 120, a memory 130, a network unit 110, an input unit 150, and an output unit 140. The processor 120 may be constituted by one or more cores and may include processors for data analysis and deep learning, which include a central processing unit (CPU), a general purpose graphics processing unit (GPGPU), a tensor processing unit (TPU), and the like of the computing device. The processor 120 may read a computer program stored in the memory 130 to perform an operation for detecting abnomaly data according to an exemplary embodiment of the present disclosure.

An operation of the processor 120 detecting abnomaly data through interaction with at least one of the memory 130, the network unit 110, the input unit 150, and the output unit 140 to detect abnomaly data will be described in detail below.

The processor 120 may read a computer program stored in the memory 130 to perform data processing for machine learning according to an exemplary embodiment of the present disclosure. According to an exemplary embodiment of the present disclosure, the processor 120 may perform a calculation for training the neural network. The processor 120 may perform calculations for training the neural network, which include processing of input data for training in deep learning (DL), extracting a feature in the input data, calculating an error, updating a weight of the neural network using backpropagation, and the like. At least one of the CPU, GPGPU, and TPU of the processor 120 may process training of a network function. For example, both the CPU and the GPGPU may process the training of the network function and data classification using the network function. Further, in an exemplary embodiment of the present disclosure, processors of a plurality of computing devices may be used together to process the training of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 120 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto. The network unit 150 according to an exemplary embodiment of the present disclosure may use an arbitrary type known wired/wireless communication systems.

An output unit 140 according to an exemplary embodiment of the present disclosure displays a user interface UI including histogram data. The output unit 140 displays a user interface as illustrated in FIG. 4. The user interface illustrated in FIG. 4 is just illustrative, but the present disclosure is not limited thereto.

The output unit 140 according to an exemplary embodiment of the present disclosure output arbitrary type of information which is generated or determined by the processor 120 or arbitrary type of information which is received by the network unit 110.

In the exemplary embodiment of the present disclosure, the output unit 140 may include at least one of a liquid crystal display (LCD), a thin film transistor liquid crystal display (TFT LCD), an organic light emitting diode (OLED), a flexible display, and a 3D display. Among them, some display modules may be configured to be transparent or light-transmissive to see the outside therethrough. This may be referred to as a transparent display module and a representative example of the transparent display module is a transparent OLED (TOLED).

In an exemplary embodiment of the present disclosure, a user input may be received through the input unit 150. The input unit 150 may include keys and/or buttons on the user interface to receive a user input or physical keys and/or buttons. The anomaly data detecting method according to some exemplary embodiments of the present disclosure which is performed by a computing device 100 may be executed according to the user input through the input unit 150. For example, the user may input setting parameter information through the input unit 150. The computing device 100 may divide the time-series data into a plurality of sub time-series data based on setting parameter information input through the input unit 150. As another example, the user may input the user input including information for division through the input unit 150. The computing device 100 may divide the time-series data into a plurality of sub time-series data based on a user input including information for division acquired by the input unit 150.

The input unit 150 according to the exemplary embodiments of the present disclosure senses button manipulation or touch input of the user to receive a signal or receives a voice or an operation of the user through a camera or a microphone to convert the voice or the operation into an input signal. To this end, speech recognition techniques or motion recognition techniques may be used.

The input unit 150 according to the exemplary embodiments of the present disclosure may be implemented as external input equipment connected to the computing device 100. For example, the input equipment may be at least one of a touch pad, a touch pen, a keyboard, and a mouse to receive the user input, but this is just illustrative and the present disclosure is not limited thereto.

In an exemplary embodiment of the present disclosure, the input unit 150 may recognize a user touch input. The input unit 150 according to the exemplary embodiment of the present disclosure may have the same configuration as the output unit 140. The input unit 150 may be configured as a touch screen which is implemented to receive a selection input of the user. The touch screen may use any one of a contact capacitive method, an infrared light sensing method, a surface acoustic wave (SAW) method, a piezoelectric method, and a resistive film method. The above-detailed description of the touch screen is just an example according to an exemplary embodiment of the present disclosure and various touch screen panels may be employed for the computing device 100. The input unit 150 configured by the touch screen includes a touch sensor. The touch sensor may be configured to convert a change of a pressure which is applied to a specific portion of the input unit 150 or a capacitance which is generated in a specific portion of the input unit 150 into an electrical input signal. The touch sensor may be configured to recognize not only a touched position and area, but also a pressure at the time of touching. The touch input to the touch sensor is recognized, corresponding signal(s) is(are) sent to a touch controller. The touch controller processes the signal(s) and then transmits corresponding data to the processor 120. By doing this, the processor 120 may recognize which area of the input unit 150 is touched.

The processor 120 according to the present disclosure acquires first time-series data. The processor 120 receives time-series data stored in the memory 130 to acquire first time-series data. The processor 120 receives time-series data from an external server through the network unit 110 to receive first time-series data. The processor 120 acquires the first time-series data through the input unit 150 included in the computing device 100. In the present disclosure, the time-series data refers to data having a temporal order, such as sensor data or observation data. The time-series data includes a plurality of variable values which is measured according to a predetermined time interval based on a specific sensor. When there is a plurality of sensors to generate time-series data, a plurality of time-series data corresponding to variable values measured by the plurality of sensors may be generated. Further, when one variable value is measured by interaction between two or more sensors, one time-series data including a plurality of variable values which is measured according to a predetermined time interval based on two or more sensors may be generated. The time-series data may be a set configured by a plurality of data elements. In the present disclosure, a data element may be matched to information about a time when the data is acquired. A plurality of data elements included in one time-series data may be distinguished according to a time when each data is acquired. The data element may refer to data at every timing included in the time-series data.

In the present disclosure, the term "first" or 'second" is used to distinguish one component from the other component and maintain the consistency as a whole in the specification, but the scope of the right is not limited by these terms. If necessary, first time-series data is also referred to as second time-series data and similarly, second time-series data is also referred to as first time series data. Further, in some exemplary embodiments according to the present disclosure, when there is no need to distinguish two or more time-series data so that an indicated subject is obviously one time-series data, for the convenience of description, the first time-series data is referred to as "time-series data".

The time-series data according to the present disclosure may be acquired from at least one sensor used to produce a plurality of different products according to a time order. In a process system which produces a specific product, one same sensor may be used to produce a plurality of different products. For example, a temperature sensor may be included in sensors used to produce a plurality of different products. In equipment which produces products A, B, and C, a temperature and/or a temperature variance required for a process of manufacturing the products A, B, and C may vary. However, even though different products are manufactured, there is one physical quantity to be measured so that one temperature sensor is used to produce the products A, B, and C. As another example, a flow sensor may be included in sensors used to produce a plurality of different products. An amount of catalyst or a compound to be injected during the process of manufacturing products A, B, and C may be different and in this case, one flow sensor is used to sequentially produce the products A, B, and C according to a time order, by controlling various flow rates. In the present disclosure, a process system which produces the products includes not only a process of producing the products, but also a process of inspecting the products to determine whether the product has a defect. The above description of the type of the sensor is just an exemplary embodiment of a sensor used to produce a plurality of different products, but the present disclosure includes sensors used to produce various products according to the time without being limited.

The processor 120 divides the first time-series data into a plurality of sub time-series data. The sub time-series data is a lower concept of the time-series data and one or more sub time-series data is collected to configure time-series data. The processor 120 divides the first time-series data into a plurality of sub time-series data based on time information included in the first time-series data. The plurality of sub time-series data may correspond to a plurality of different time intervals. The time interval corresponding to sub time-series data according to the present disclosure may be one continuous time interval. Specifically, a time interval corresponding to arbitrary "A" sub time-series data may be one continuous time interval such as [$t\_a$, $t\_b$] ($t\_b$>$t\_a$). The time interval corresponding to sub time-series data according to the present disclosure may be a plurality of discontinuous time intervals. Specifically, a time interval corresponding to arbitrary "B" sub time-series data may be a plurality of discontinuous time intervals such as [$t\_c$, $t\_d$], [$t\_e$, $t\_f$] ($t\_f$>$t\_e$>$t\_d$>$t\_c$).

The processor 120 according to the exemplary embodiment of the present disclosure divides the first time-series data into a plurality of sub time-series data based on setting parameter information. In the present disclosure, the setting parameter information may be hyper-parameter information given by a user who drives a production facility. The setting parameter information may be input through the input unit 150 of the computing device 100. The setting parameter information may be transmitted from the outside through the network unit 110 of the computing device 100. For example, the setting parameter information includes an output of a compressor, a magnitude of an applied voltage, a current amount, a concentration of a solution, a flow rate of a liquid. The setting parameter information of the present disclosure is configured by fixed values given by the user so that the sensor data acquired by observation of actual physical quantities and the setting parameter information may be distinguished. Generally, even though the setting parameter information is given to control the value, there may be a difference between actually observed sensor data and the input setting parameter information. At this time, the setting parameter information is understood as an independent variable and sensor data acquired from one or more sensors is understood as a dependent variable according to the independent variable. In the present exemplary embodiment, the first time-series data may be data acquired from one or more sensors as a result of inputting the setting parameter information by the user to the computing device 100. The change of the first time series data may be based on the change of the setting parameter information. For example, the user inputs setting parameter information to manufacture the product A from a time t1 to a time t2 (t2>t1) to the computing device 100 and inputs setting parameter information to manufacture the product B from a time t2 to a time t3 (t3>t2) to the computing device 100. At this time, the processor 120 divides the first time-series data which is acquired from one or more sensors and includes variable values from the time t1 to the time t3 into sub time-series data corresponding to a time interval [t1, t2] and sub time-series data corresponding to a time interval [t2, t3].

According to the exemplary embodiments, the processor 120 may divide the first time-series data into a plurality of sub time-series data based on setting parameter information which is one of input information of the user, instead of deriving from the first time-series data the time interval which is a reference for dividing the first time-series data. That is, the processor 120 may divide a subsequent observation value based on a preceding input value in a relationship of the preceding input value (for example, setting parameter information)-subsequent observation value (for example, time-series data acquired from at least one sensor). By doing this, the time-series data is divided according to the reference having a cause-and-effect relationship and anomaly data is detected to allow the user to clearly analyze the data.

The processor 120 according to the exemplary embodiment of the present disclosure may divide the first time-series data into a plurality of sub time-series data based on histogram data representing statistic information about the plurality of variable values included in the first time series data. The statistic information about the plurality of variable values included in the first time-series data may be a number of data elements having the same variable value for example. Hereinafter, this will be described in detail with reference to FIGS. 3 and 4.

FIG. 3 is an exemplary view illustrating first time-series data according to an exemplary embodiment of the present disclosure on a graph. A horizontal axis of the first time-series data illustrated in FIG. 3 represents a time and a vertical axis represents a variable value. As illustrated in FIG. 3, the time-series data includes a plurality of variable values measured at a plurality of times according to a predetermined time intervals. A first variable value interval 310, a second variable value interval 330, and a third variable value interval 350 may include sets of different data. A first variable value section 310, a second variable value section 330, and a third variable value section 350 may be allocated to different ranges of variable values. For example, the first time-series data may be data acquired by a single sensor during a process of producing different kinds of products. In this case, the first variable value section 310, the second variable value section 330, and the third variable value section 350 represented in the first time-series data may be values measured during the process of producing different products. The processor 120 may divide the time-series data into a plurality of sub time-series data based on a variable value range.

FIG. 4 is an exemplary diagram illustrating histogram data representing statistic information about a plurality of variable values included in first time-series data according to an exemplary embodiment of the present disclosure on a graph. A horizontal axis of histogram data illustrated in FIG. 4 represents a variable value and a vertical axis represents a number of data elements (count) having the corresponding variable value. That is, the processor 120 counts the number of data elements having the same variable value in the acquired first time-series data to generate histogram data. In the histogram data, a fourth variable value section 410, a fifth variable value section 430, and a sixth variable value section 450 may be allocated to ranges of different variable values. The fourth variable value section 410, the fifth variable value section 430, and the sixth variable value section 450 may correspond to a data cluster included in the histogram data. A method of identifying the data cluster included in the histogram data by the processor 120 according to the present disclosure will be described below in detail. The horizontal axis of the histogram data illustrated in FIG. 4 may correspond to a vertical axis of the time-series data illustrated in FIG. 3. That is, the first variable value section 310, the second variable value section 330, and the third variable value section 350 of FIG. 3 may correspond to the fourth variable value section 410, the fifth variable value section 430, and the sixth variable value section 450 of FIG. 4, in this order. For example, when the fourth variable value section 410, the fifth variable value section 430, and the sixth variable value section 450 are determined based on the histogram data of FIG. 4, the processor 120 may divide the first time-series data of FIG. 3 into sub time-series data configured by data elements included in the first variable value section 310, sub time-series data configured by data elements included in the second variable value section 330, and sub time-series data configured by data elements included in the third variable value section 350. In this case, each sub time-series data may correspond to a plurality of discontinuous time intervals.

Hereinafter, some exemplary embodiments in which the processor 120 according to the present disclosure identifies one or more data cluster included in the histogram data will be described.

According to the present disclosure, a first exemplary embodiment in which the time-series data is divided into a plurality of sub time-series data based on the histogram data may be implemented as follows, by the computing device 100. The computing device 100 may display a user interface including histogram data to divide the time-series data into a plurality of sub time-series data on the output unit 140. The computing device 100 may receive the user input including information for division through the input unit 150. Referring to FIG. 4 for specific description, the computing device 100 may display the user interface including histogram data illustrated in FIG. 4 on the output unit 140. The user who uses the computing device 100 inputs a user input to divide the first time-series data to the input unit 150 based on histogram data displayed on the output unit 140. For example, the computing device 100 receives a user input including section information related to the fourth variable value section 410, the fifth variable value section 430, and the sixth variable value section 450 through the input unit 150. Thereafter, the processor 120 may divide the first time-series data into a plurality of sub time-series data based on the user input input through the input unit 150.

According to the present disclosure, a second exemplary embodiment in which the time-series data is divided into a plurality of sub time-series data based on the histogram data may be implemented as follows, by the processor 120. The processor 120 applies a k-means clustering algorithm to histogram data to divide the time-series data into a plurality of sub time-series data.

The processor 120 according to the present disclosure may determine a minimum value and a maximum value of the number K of clusters for the K-means clustering. The minimum value and the maximum value of K may be selected from 1 to a number of data elements included in the time-series data. The processor 120 may perform the K-means clustering algorithm on a plurality of different K values to find an appropriate K value. In an exemplary embodiment about an operation performed by the processor 120 to find the appropriate K value, the processor 120 applies the K-means clustering algorithm to the histogram data about the first time-series data. At this time, the processor 120 iteratively performs the K-means clustering algorithm while sequentially increasing the K value from 1 to find an appropriate K value. The processor 120 may obtain a sum of distances between each data and center points of the K clusters. At this time, as the K value for clustering is appropriately set, the sum of distances is reduced. The processor 120 repeats the operation of sequentially increasing the K value from 1 to calculate a specific value K at which the sum of distances becomes equal to or smaller than a predetermined value for the first time. If a magnitude of K at which the sum of distances between each data and the center points of K clusters is smaller than a predetermined value for the first time is 3, the processor 120 may cluster the histogram data about the first time-series data to make the number of clusters three. The processor 120 may divide the first time-series data based on a section of the plurality of variable values determined for the histogram data about the first time-series data.

However, the specific above description of the first exemplary embodiment and the second exemplary embodiment which divide the time-series data into the plurality of sub time-series data based on the histogram data is merely some exemplary embodiments for description of the dividing method based on the histogram data according to the present disclosure, but the present disclosure is not limited thereto.

The processor 120 according to the present disclosure may adjust a scale of the variable values included in at least one sub time-series data among a plurality of sub time-series data. In the present disclosure, "scale" may be interchangeably used with a "range of a variable value". Further, a sentence "adjust a scale of a variable value" may be interchangeably used with a sentence "change a range of a variable value". In the present disclosure, when a scale of a variable value included in at least one sub time-series data among a plurality of sub time-series data included in the time-series data is adjusted, the corresponding time-series data may be referred to as "scaled time-series data". The processor 120 adjusts a scale of the variable value included in at least one sub time-series data to perform a data preprocessing task to normalize at least some of values included in the time-series data.

In one exemplary embodiment of the present disclosure, the processor 120 applies a scaling function to sub time-series data to adjust a scale of variable values included in the sub time-series data. The scaling function may be a standard scaling function or a min-max scaling function.

The processor 120 according to the present disclosure applies a standard scaling function to at least one sub time-series data to adjust a scale of the variable values included in the sub time-series data with respect to how much the variable values of the individual data elements included in the sub time-series data is far from an average of variable values of all the data elements included in the sub time-series data. For example, the processor 120 may subtract a mean variable value of all the data elements included in the sub time-series data from each variable value of the data elements included in the sub time-series data. The processor 120 may divide the result values of the subtraction by a standard deviation of all the data elements included in the sub time-series data to change the range of variable values included in the sub time-series data to a range following a Gaussian normal distribution.

The processor 120 according to the present disclosure applies the min-max scaling function to at least one sub time-series data to adjust the scale of the variable values included in the sub time-series data based on a maximum value and a minimum value of the variable values, among the plurality of variable values included in the sub time-series data. For example, the processor 120 may subtract the maximum value among variable values included in the sub time-series data from each variable value of the data elements included in the sub time-series data. The processor 120 divides the result value of the subtraction by a difference between the maximum value and the minimum value among the variable values included in the sub time-series data to calculate to change the range of variable values included in the sub time-series data to [0, 1].

The processor 120 according to the present disclosure may adjust a scale of the variable values included in the sub time-series data based on a previously determined robust mean. In the present disclosure, the robust mean may be calculated based on a plurality of time-series data which has been stored in advance in the computing device 100. The robust mean may be calculated based on the following Equation 1.

$$\text{robust mean} = \text{mean}\left(\frac{\text{train data} - \text{quantile}(0.01)}{\text{quantile}(0.99) - \text{quantile}(0.01)}\right) \quad \text{[Equation 1]}$$

In Equation 1, train data refers to each data included in a data set which becomes a reference of calculating a robust mean. A quantile(X) function is a function which returns data corresponding to a specific quantile among percentiles in a data set. X may be a real number between 0 and 1. For example, a quantile(0.99) means data corresponding to a 99-th percentile and a quantile(0.01) means data corresponding to a first percentile. The processor 120 may subtract a variable value of data corresponding to quantile(0.01) from a variable value of each train data and then divide the value by quantile(0.99)-quantile(0.01). Thereafter, the processor 120 averages results of the calculation of dividing all train data included in the data set which becomes a reference of calculating the robust mean by the quantile(0.99)-quantile (0.01) to calculate the robust mean. The data set which becomes a reference of calculating the robust mean may be a data set which is set in advance to train a neural network based detection model. The training method of the neural network based detection model will be described in detail. The robust mean may be calculated for every sub time-series data. Influences of outlier data at both extremes of the entire data set are eliminated so that the robust mean according to the present disclosure is advantageous to be a basis of the effective scaling.

The processor 120 according to the present disclosure may adjust a scale of the variable values included in the sub time-series data using a scaling function based on the robust mean. For example, the scaling function based on the robust mean is expressed by Equation 2.

$$\text{scaled data} = \left(\frac{\text{data} - \text{quantile}(0.01)}{\text{quantile}(0.99) - \text{quantile}(0.01)}\right) - \text{robust mean} \quad \text{[Equation 2]}$$

Data of Equation 2 refers to newly acquired time-series data other than data used for the process of deriving the robust mean. The robust mean of Equation 2 may be calculated based on the above-described Equation 1.

When the scale of the variable values included in at least one sub time-series data are adjusted based on the above-described Equations 1 and 2, if time-series data having a variable value change pattern similar to the time-series data used to calculate the robust mean and a similar time length is newly input, the influence of the outlier data is minimized and input data may be more precisely preprocessed.

The description of the above-described scaling functions specifically describes some of the scaling functions used to adjust the scale of the variable values included in the sub time-series data so that the present disclosure includes various scaling methods without being limited.

In one exemplary embodiment of the present disclosure, the processor 120 applies a scaling function to each of two or more different sub time-series data among the plurality of sub time-series data included in the time-series data to adjust the scale of the variable values. Scaling functions applied to each of two or more different sub time-series data may be different functions. For example, as an exemplary embodiment, the standard scaling function is applied to the first sub time-series data among the plurality of sub time-series data and the min-max scaling function is applied to the second sub time-series data.

The processor 120 may perform the data preprocessing task to make a shape of the entire time-series data constant by applying the scaling function to each of the plurality of sub time-series data divided from the time-series data by the above-described dividing method. Hereinafter, the task of preprocessing the time-series data by the processor 120 will be described in detail with reference to FIGS. 5 and 6.

FIG. 5 is an exemplary diagram illustrating time-series data which is divided into a plurality of sections on a graph. As illustrated in FIG. 5, the processor 120 may divide time-series data having a variable value which changes over the time into a plurality of sub time-series data based on one method of the above-described dividing methods. In the example of FIG. 5, the time-series data may include sub time-series data 510 corresponding to a section [t=0, t=t1], sub time-series data 530 corresponding to a section [t=t1, t=t2], sub time-series data 550 corresponding to a section [t=t2, t=t3], and sub time-series data 570 corresponding to a section [t=t3, t=t4]. The sub time-series data corresponding to reference numerals 510 to 570, included in the time-series data may be variable values acquired during the process of producing a plurality of different products based on one sensor.

FIG. 6 is an exemplary diagram illustrating scaled time-series data on a graph. In the example of FIG. 6, the scaled time-series data may include scaled sub time-series data 610 corresponding to a section [t=0, t=t1], scaled sub time-series data 630 corresponding to a section [t=t1, t=t2], scaled sub time-series data 650 corresponding to a section [t=t2, t=t3], and scaled sub time-series data 670 corresponding to a section [t=t3, t=t4]. The scaled sub time-series data denoted by reference numerals 610 to 670 may correspond to sub time-series data denoted by reference numerals 510 to 570 of FIG. 5, in this order. The processor 120 scales the time-series data illustrated in FIG. 5 for the plurality of sections to calculate the scaled time-series data illustrated in FIG. 6. v1 of FIG. 6 may be an upper bound of the scaled time-series data which is calculated by the trained neural network based detection model. v2 of FIG. 6 may be a lower bound of the scaled time-series data which is calculated by the trained neural network based detection model.

In a general manufacturing process, even in the process of producing the same product, time-series data observed by at least one sensor may have various patterns according to the change of the time. In addition, even when a plurality of different products is produced using the same production facility, the time-series data observed by at least one sensor according to the change of time may have various patterns.

In order to describe the effect of the present disclosure, it is assumed that the time-series data as illustrated in FIG. 3 is acquired. At this time, when the training and the inference of the neural network based anomaly data detection model is performed using the time-series data of the FIG. 3 as it is, if the time-series data follows a multi-modal distribution having a plurality of maximum values, the neural network based detection model trains the multi-modal type data distribution as a normal pattern so that a performance of distinguishing an anomaly pattern is deteriorated. Accordingly, the anomaly data detecting method according to the present disclosure applies a scaling function to the plurality of sub time-series data divided from the time-series data to perform the data preprocessing task to allow a value of the time-series data to be input to the neural network based detection model to be present in a predetermined range. That is, the present disclosure discloses a method for scaling the time-series data according to a plurality of sections to disclose a preprocessing method of generating data appropriate for the training and the inference of the detection model. Hereinafter, a structure of a neural network based detection model and a training method to process scaled time-series data will be described.

The processor 120 according to the present disclosure inputs a scaled time-series data to a neural network based detection model to determine whether time-series data is abnormal.

FIG. 2 is a conceptual view illustrating a neural network according to an exemplary embodiment of the present disclosure.

A neural network model according to the exemplary embodiment of the present disclosure may include a neural network for evaluating placement of the semiconductor device. Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa. In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised learning, unsupervised learning, semi supervised learning, or reinforcement learning. The learning of the neural network may be a process in which the neural network applies knowledge for performing a specific operation to the neural network.

The neural network may be trained in a direction to minimize errors of an output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a training cycle (epoch). The learning rate may be applied differently according to the number of repetition times of the training cycle of the neural network. For example, in an initial stage of the training of the neural network, the neural network ensures a certain level of performance quickly by using a high learning rate, thereby increasing efficiency and uses a low learning rate in a latter stage of the training, thereby increasing accuracy.

In training of the neural network, the training data may be generally a subset of actual data (i.e., data to be processed using the trained neural network), and as a result, there may be a training cycle in which errors for the training data decrease, but the errors for the actual data increase. Overfitting is a phenomenon in which the errors for the actual data increase due to excessive training of the training data. For example, a phenomenon in which the neural network that trains a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of training, utilization of a batch normalization layer, etc., may be applied.

The processor 120 according to the present disclosure applies a plurality of time intervals used to divide the first time-series data to second time-series data which is different from the first time-series data to determine whether the second time-series data is abnormal. In the present disclosure, the first time-series data and the second time-series data may be different time-series data which is acquired by different sensors during the process of producing one product. The entire time intervals corresponding to the first time-series data and the second time-series data have the same length. For example, a process system for manufacturing one same product includes a flow sensor, a current sensor, a temperature sensor, and a velocity sensor. At this time the time-series data acquired by the flow sensor is understood as first time-series data and the time-series data acquired by the current sensor is understood as second time-series data.

The processor 120 according to the present disclosure may divide the second time-series data into a plurality of second sub time-series data based on a plurality of time intervals corresponding to each of the plurality of sub time-series data for the first time-series data. An operation of dividing the first time-series data into a plurality of sub time-series data may be previously performed according to any one method of the above-described dividing methods. At this time, the processor 120 may divide the second time-series data as same as the plurality of time intervals used to divide the first time-series data into a plurality of sub time-series data. In the present exemplary embodiment, the reason that the processor 120 applies the plurality of time intervals which is applied to the first time-series data acquired by a specific sensor to second time-series data acquired from a sensor different from the specific sensor is because even though the unit, the physical quantity, or a magnitude of the numerical value of the variable value to be measured is different, the same fact that the pattern changes according to the time is maintained. For example, in the circumstance that one product is manufactured, if the flow sensor value is changed, the value of the current sensor may be changed with respect to the same time. As another example, when a plurality of different products is sequentially produced according to the time order, similarly, if one sensor value is changed, a value of the other sensor may be changed at the same time.

The processor 120 according to the present disclosure may adjust a scale of the variable values included in at least one second sub time-series data among a plurality of second sub time-series data. The scaling function which is applied to variable values included in the second sub time-series data may be independently calculated from the sub time-series data related to the first time-series data. The processor 120 inputs the scaled second time series data to the neural network based detection model to determine whether the second time-series data is abnormal.

As described above, according to the present disclosure, based on empirical knowledge that even though the first time-series data and the second time-series data are different types of time-series data, a method for setting a time interval for scaling is shared, the contents of dividing the second time-series data based on the time interval of the first time-series data is disclosed. The description may be effective to detect whether many time-series data is abnormal. Even though a plurality of time-series data is to be inspected, if a time interval reference for division only for one time-series data is prepared, the processor 120 may quickly detect anomaly data from the other time-series data without additional time consumption. Specifically, the time-series data acquired to make one product may reach hundreds, thousands or more and at this time, all time-series data may be a target to determine whether it is abnormal. If the processor 120 repeats a step of setting a time interval for dividing all time-series data, this may be a time-consuming task. In contrast, when the above-described description is used, time interval information for one time-series data is utilized to quickly preprocess the remaining time-series data.

FIG. 7 is an exemplary flowchart of a method for detecting anomaly data by a computing device according to an exemplary embodiment of the present disclosure. In step S710, the processor 120 acquires first time-series data. In step S730, the processor 120 divides the first time-series data into a plurality of sub time-series data. The processor 120 divides the first time-series data into a plurality of sub time-series data based on setting parameter information. The processor 120 may divide the first time-series data into a plurality of sub time-series data based on histogram data representing statistic information about the plurality of variable values included in the first time series data. In an exemplary embodiment of dividing first time-series data into a plurality of sub time-series data based on histogram data, the computing device 100 receives a user input including information for division through the input unit 150. The user may input the user input based on a histogram data related user interface displayed on the output unit 140 of the computing device 100. According to another exemplary embodiment of dividing the first time-series data into a plurality of sub time-series data based on histogram data, the processor 120 applies a K-means clustering algorithm to the histogram data to divide the first time-series data into a plurality of sub time-series data. In step S750, the processor 120 may adjust a scale of the variable values included in at least one sub time-series data among a plurality of sub time-series data. For example, the processor 120 may adjust the scale of the variable values included in at least one sub time-series data among the plurality of sub time-series data using a standard scaling function, a min-max scaling function, or a scaling function based on the robust mean. In step S770, the processor 120 inputs the scaled first time series data to the neural network based detection model to determine whether the first time-series data is abnormal. The neural network based detection model may be a model which is trained in advance based on at least one time-series data for training. The processor 120 divides the time-series data for training into a plurality of sub time-series data and trains the neural network based detection model using at least one scaled time-series data for training generated as a result of adjusting a scale of variable values included in at least one sub time-series data among the plurality of sub time-series data divided from the time-series data for training.

When anomaly data is detected using a neural network based detection model according to one or more processes illustrated in FIG. 7, even though the distribution of time-series data has a plurality of peak values, the performance of the neural network based detection model may be ensured. Generally, when input data having a plurality of peak values is input to the neural network as it is to perform the training to distinguish a normal pattern from an abnormal pattern, a number of parameters to express the normal pattern to be trained or a training difficulty is increased so that an ability to distinguish the normal pattern from the abnormal pattern is degraded. Accordingly, an anomaly data detecting method according to the present disclosure discloses a method of effectively preprocessing time-series data to be input to a neural network based detection model by dividing time-series data into a plurality of sub time-series data by a processor 120 and then applying a scaling function to each of the divided sub time-series data.

FIG. 8 is an exemplary flowchart of a method for detecting anomaly data by a computing device according to another exemplary embodiment of the present disclosure. In step S810, the processor 120 acquires first time-series data. In step S820, the processor 120 acquires second time-series data which is different from the first time-series data. The entire times corresponding to the first time-series data and the second time-series data have the same length. The first time-series data and the second time-series data may be time-series data acquired from different sensors for the same time. In step S830, the processor 120 divides the first time-series data into a plurality of sub time-series data. The dividing method has been described in detail above, so that description thereof will be omitted. In step S840, the processor 120 may divide the second time-series data into a plurality of second sub time-series data based on a plurality of time intervals corresponding to each of the plurality of sub time-series data for the first time-series data. The processor 120 may divide second time-series data into a plurality of second sub time-series data using the same time interval information as a plurality of time interval information used to divide the first time-series data. In step S850, the processor 120 may adjust a scale of variable values included in at least one second sub time-series data among plurality of second sub time-series data calculated as the result of step S840. The scale adjusting method has been described in detail above, so that description thereof will be omitted. In step S860, the processor 120 inputs the scaled second time-series data to the neural network based detection model to determine whether the second time-series data is abnormal.

FIG. 9 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

The invention claimed is:

1. An anomaly data detecting method, comprising:
    acquiring first time-series data and second time-series data, wherein the first time-series data is acquired from at least one sensor used to produce a plurality of different products according to a time order;
    dividing the first time-series data into a plurality of first sub time-series data and dividing the second time-series data into a plurality of second sub time-series data based on a plurality of time intervals corresponding to the plurality of first sub time-series data for the first time-series data, wherein the dividing is performed based on histogram data representing statistic information related to a plurality of variable values included in the first time-series data and by applying a K-means clustering algorithm to the histogram data;
    adjusting a scale of variable values included in at least one sub time-series data among the plurality of first or second sub time-series data; and
    determining whether the first or second time-series data is abnormal by inputting scaled first or second time-series data to a neural network based detection model.

2. The anomaly data detecting method according to claim 1, wherein the dividing is performed based on time information included in the first or second time-series data and each of the plurality of first or second sub time-series data corresponds to a plurality of different time intervals.

3. The anomaly data detecting method according to claim 1, wherein the dividing including: dividing the first time-series data into a plurality of first sub time-series data based on setting parameter information, and the first time-series data is acquired from one or more sensors as a result of inputting the setting parameter information to the computing device.

4. The anomaly data detecting method according to claim 1, wherein the dividing includes:
    displaying a user interface including the histogram data;
    receiving a user input including information for division; and
    dividing the first time-series data into a plurality of first sub time-series data based on the received user input.

5. The anomaly data detecting method according to claim 1, wherein the adjusting is performed by applying a scaling function to at least one sub time-series data among the plurality of first or second sub time-series data.

6. The anomaly data detecting method according to claim 1, wherein the adjusting is performed by applying a scaling function to two or more different sub time-series data among the plurality of first or second sub time-series data.

7. The anomaly data detecting method according to claim 5, wherein the scaling function is a standard scaling function or a min-max scaling function.

8. The anomaly data detecting method according to claim 1, wherein the adjusting is performed based on a previously determined robust mean.

9. The anomaly data detecting method according to claim 8, wherein the robust mean is calculated based on a plurality of time-series data which is stored in advance in a computing device.

10. The anomaly data detecting method according to claim 1, wherein the neural network based detection model has an auto encoder neural network structure including an encoder model and a decoder model.

11. The anomaly data detecting method according to claim 1, wherein the neural network based detection model is trained based on at least one scaled training time-series data generated as a result of performing the dividing and the adjusting on at least one training time-series data.

12. The anomaly data detecting method according to claim 1, wherein the second time-series data includes second time-series data which is different from the first time-series data.

13. A computer program stored in a non-transitory computer readable storage medium, wherein when the computer program is executed by one or more processors to perform the following operations to detect anomaly data, the operations including:
  an operation of acquiring first time-series data and second time-series data, wherein the first time-series data is acquired from at least one sensor used to produce a plurality of different products according to a time order;
  an operation of dividing the first time-series data into a plurality of first sub time-series data and dividing the second time-series data into a plurality of second sub time-series data based on a plurality of time intervals corresponding to the plurality of first sub time-series data for the first time-series data, wherein the dividing is performed based on histogram data representing statistic information related to a plurality of variable values included in the first time-series data and by applying a K-means clustering algorithm to the histogram data;
  an operation of adjusting a scale of variable values included in at least one sub time-series data among the plurality of first or second sub time-series data; and
  an operation of determining whether the first or second time-series data is abnormal by inputting scaled first or second time-series data to a neural network based detection model.

14. An anomaly data detecting apparatus, comprising:
one or more processors;
a memory; and
a network unit,
wherein the one or more processors are configured to:
  acquire first time-series data and second time-series data, wherein the first time-series data is acquired from at least one sensor used to produce a plurality of different products according to a time order;
  divide the first time-series data into a plurality of first sub time-series data, and divide the second time-series data into a plurality of second sub time-series data based on a plurality of time intervals corresponding to each of the plurality of first sub time-series data for the first time-series data, wherein the dividing is performed based on histogram data representing statistic information related to a plurality of variable values included in the first time-series data and by applying a K-means clustering algorithm to the histogram data;
  adjust a scale of variable values included in at least one sub time-series data among the plurality of first or second sub time-series data; and
  determine whether the first or second time-series data is abnormal by inputting scaled first or second time-series data to a neural network based detection model.

* * * * *